United States Patent [19]

Schaupert

[11] Patent Number: 5,376,197
[45] Date of Patent: Dec. 27, 1994

[54] FORMATION OF A REMOVABLE SURFACE AREA ON A SUBSTRATE

[75] Inventor: Kurt Schaupert, Hofheim-Wallau, Germany

[73] Assignee: Schott Glaswerke, Mainz, Germany

[21] Appl. No.: 119,605

[22] Filed: Sep. 13, 1993

[30] Foreign Application Priority Data

Sep. 14, 1992 [DE] Germany .............................. 4230732

[51] Int. Cl.$^5$ .............................................. C04B 37/00
[52] U.S. Cl. ......................................... 156/89; 65/28; 65/36; 65/56; 65/60.1; 65/60.5; 65/60.53; 65/94; 65/23; 264/131; 264/132; 264/133; 156/344; 156/86
[58] Field of Search ................. 65/28, 23, 61, 41, 56, 65/62, 59.22, 59.21, 60.1, 60.2, 60.5, 60.53, 94, 99.1; 156/344, 89, 85, 86, 84, 247, ; 264/131, 132, 133, 234, 237, 332, DIG. 48

[56] References Cited

U.S. PATENT DOCUMENTS

| | | | |
|---|---|---|---|
| 1,815,146 | 7/1931 | Erber | 65/23 |
| 1,923,070 | 8/1933 | Belknap | 65/41 |
| 1,960,121 | 2/1930 | Moulton | 65/41 |
| 2,521,845 | 9/1950 | Gregory | 65/56 |
| 2,542,134 | 2/1951 | Gregory | 65/56 |
| 3,149,945 | 9/1964 | Bertrand et al. | 65/23 |
| 3,539,387 | 11/1970 | Kelly et al. | 117/123 |
| 3,549,784 | 12/1970 | Hangis | 29/625 |
| 3,649,440 | 3/1972 | Megles | 65/41 |
| 3,673,049 | 6/1972 | Giffon et al. | 65/41 |
| 3,849,097 | 11/1974 | Gifton et al. | 65/41 |
| 5,073,180 | 12/1991 | Fanoog et al. | 65/23 |
| 5,176,771 | 1/1993 | Bravo et al. | 156/344 |

FOREIGN PATENT DOCUMENTS

| | | | |
|---|---|---|---|
| 0148427 | 7/1985 | European Pat. Off. | |
| 649710 | 12/1964 | France | 65/23 |
| 952780 | 8/1982 | U.S.S.R. | 65/56 |

OTHER PUBLICATIONS

Römpps Chemie-Lexikon, "Tenside," pp. 3494-3498 (1977).

Römpps Chemie-Lexikon, "Verdickungsmittel," p. 3792 (1977).

Primary Examiner—Karen M. Hastings
Assistant Examiner—Mark De Simone
Attorney, Agent, or Firm—Millen, White, Zelano & Branigan

[57] ABSTRACT

Process for the formation of a removable surface area of a specific depth on a substrate with all coatings seated on the surface of the substrate, wherein a layer of a material, thin as related to the substrate, with a thermal expansion coefficient strongly deviating as compared with the substrate, is bonded to the substrate at one temperature and is subsequently cooled to another temperature.

19 Claims, 1 Drawing Sheet

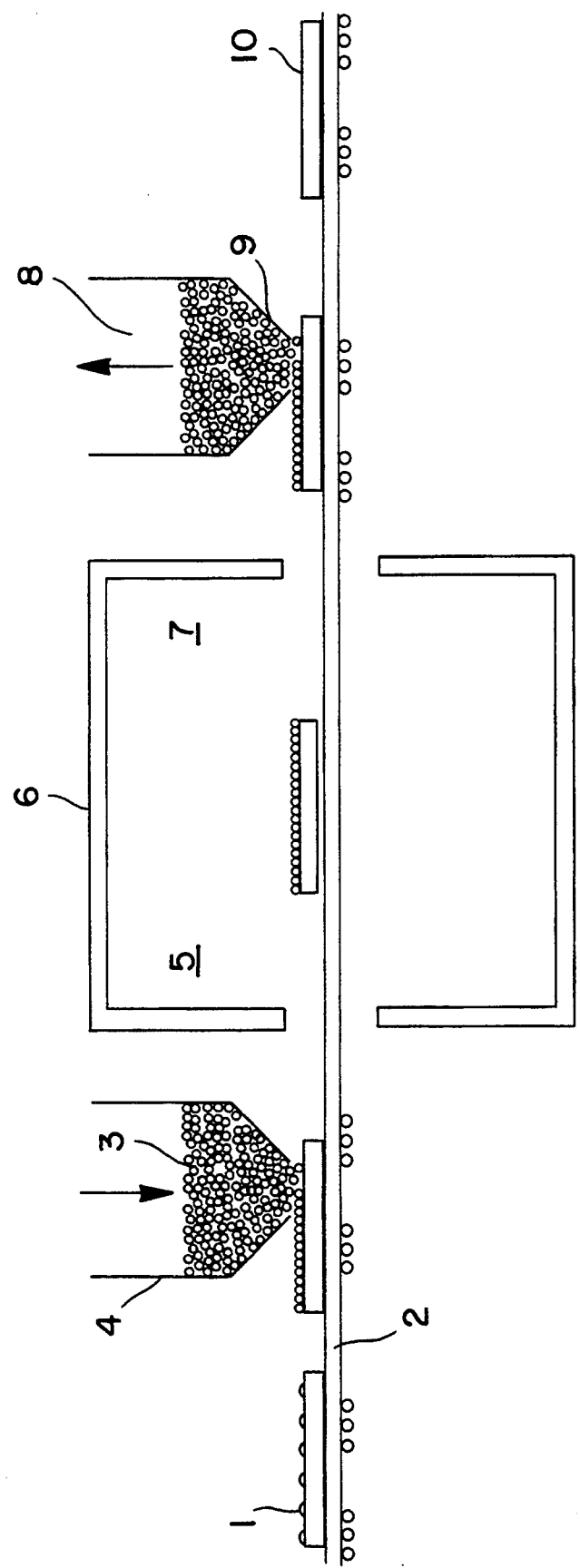

FORMATION OF A REMOVABLE SURFACE AREA ON A SUBSTRATE

BACKGROUND OF THE INVENTION

This invention relates to the formation of a removable surface area of a certain depth on a substrate, along with all coatings, such as designs, glazings, sealants, protective coats and color coats, seated on the surface of the substrate. The invention also concerns a substrate reduced by a surface area of a certain depth, produced according to the proposed process.

It is frequently technically necessary or desirable to clean substrates on their surfaces and/or to free them of adhering coatings.

It is, in part, a very complicated and expensive necessity to separate the coating from the substrate, particularly if the substrate represents a valuable, reusable raw material, the properties of which are negatively altered by the adhering coatings in case of reuse of the substrate:

—In case the produced coating does not satisfy the technical requirements due to production errors, such as, for example, partial detachment, running of decorations, or the like, —or in case the aesthetic impression deviates from the given standard, for example due to color changes.

Moreover, to an increasing extent, the manufacturer is forced by regulations and enacted laws to take his products back in the used state after they have served the customer.

In order to avoid paying additional costs for storage space, warehouse administration, and waste disposal, it is necessary to recycle these used products as "new" raw materials by incorporation into the respective manufacturing process. In this way, on the one hand, the expenses for storage of the returned, used products are considerably reduced and, on the other hand, expensive raw materials are, in part, saved by the recycling of these products.

However, frequently coatings or contaminations attached to the used product to be recycled must be removed since these prevent or decisively restrict the recycling of the basic material which otherwise would be technically feasible and advantageous.

Firmly entrenched coatings and/or contaminants, however, can be removed from the support in most cases only with very great expense and by complicated methods.

The state of the art is, for example:

—Mechanical grinding off or cutting off of the coatings, which takes a large amount of time, requires, in part, a great expenditure in costly machinery, grinding and separating agents, and moreover entails waste disposal problems in connection with the thus-produced fine dusts, coolants, and in wet processes the separation and concentration of the dust-containing suspensions.

—The burning off and oxidation of the coatings and/or contaminations with, in part, large amounts of emissions of possibly toxic gases, including a plurality of difficultly determinable organic and inorganic intermediates, in dependence on the temperature, the burner operation, and the atmosphere during the burning step.

Moreover, the energy costs to be expended in such processes are very high. Also, the furnace facilities and the flue gas and waste gas purification units which must be resistant to large amounts of fluxes, such as $Pb^{2+}$, $K^+$, $Li^+$, $Na^+$, etc., and corrosive gases containing $F^-$, $Cl^-$, are very expensive.

—Removal by caustics or etching with acids and/or bases. These processes are likewise complicated from an industrial viewpoint and expensive; moreover, the thus-formed reaction products can be disposed of as waste only with great difficulties.

SUMMARY OF THE INVENTION

It is, therefore, an object of the invention to remove, in an economical and nonpolluting manner, coatings and/or contaminations firmly seated on the surface of substrates, which coatings or contaminations would make it impossible to recycle the substrate or would permit such recycling only to a very limited extent. It is furthermore an object of this invention to process and neutralize the thus-detached contaminants in an environmentally neutral and chemically inert fashion so that their waste disposal no longer presents any significant problems, if at all.

Upon further study of the specification and appended claims, further objects and advantages of this invention will become apparent to those skilled in the art.

The objects of the invention are attained by depositing a layer of a material, thin as related to the substrate, and having a thermal expansion coefficient at least 10 times that of the substrate. The layer is bonded to the substrate at one temperature and is subsequently cooled to another temperature in order to fracture the layer so as to enable it to be removed from the substrate along with a very thin skin of the substrate.

This process has proven to be extraordinarily efficient, especially in case of decorated glass ceramic plates, i.e., when using a glass ceramic as the substrate.

Glass ceramic plates will, in all likelihood, be recalled by the manufacturer starting with 1994, in order to comply with legal requirements, on the one hand, and, on the other hand, in order to return an actually valuable raw material to the production process. Such glass ceramic plates are generally but not necessarily in the form of decorated cooking surfaces, heatable plates for grilling food, fireplace panes, etc.

The decoration here is likewise a problem. Without decorative designs, it is possible to remelt without problems up to 60% by weight of glass ceramic, for example, as shards but also from old, used plates. Decorated glass ceramic can be recycled to an extent of maximally 10%; and even this small proportion may already present problems.

The decoration contains foreign substances which must not be present in the glass blend, or may be included only in very minor quantities. Therefore, removal of the designs from the surface of the glass ceramic is absolutely necessary lest the composition of the glass blend be altered by the addition of decorated shards and scrap from faulty production or from recycled batches.

When adding lead-containing decorations, for example, the lead would accumulate to an undue extent without prior removal of the decoration. Similar considerations hold true for many other oxides, such as, for example, those of iron which would alter the composition of the base glass blend in such a way that, for instance, a reproducible ceraming process, with identical properties of the final product, would no longer be attainable.

Also the pigments from the decoration change the transmission to light of the glass ceramic and lead to a glass mixture that does not yield any uniform products with ensurable quality features during ceraming and with respect to the usage properties.

The requisite removal of the decoration has become possible without any problems according to the process of this invention, avoiding the aforementioned disadvantages of the heretofore known surface coating removal methods.

The material employed for bonding to the substrate (for example, a glass ceramic) at a certain temperature is a conventional soda lime glass.

The process herein exploits the differences of the thermal expansion coefficients. Glass ceramic exhibits, for example, a thermal expansion ranging by a factor of 20–60 below that of other types of glass.

Differences in thermal expansion by at least a factor of 10 are necessary for performing the process according to this invention.

Therefore, the glass utilized can practically be any conventional kind of glass. Preferred, though, are float glass, low-melting special glasses, but also scrap glasses, especially those which already contain lead.

Float glass is advantageous because it is economically obtainable in defined thicknesses and cut sizes; low-melting specialty glasses, though expensive, considerably reduce the temperatures at which the glass bonds to the substrate and thereby, in part, save energy costs. The use of scrap glass materials is especially economical; these likewise do not lend themselves to recycling and thus must be disposed off as waste, because they contain, for example, lead or similar compounds; in the present process, they can be efficiently reused. Scrap glass has the drawback that it is frequently present only in broken form, as shards.

It proved to be advantageous according to the present invention to place the glass in the form of a thin plate on the substrate.

Advantages in this connection are the defined thicknesses of glass plates and the possibility of covering large surface areas quickly and simply.

However, there are limits to the size of the glass plates since care must be taken that gaseous reaction products formed at an elevated temperature, for example, due to occluded atmospheric moisture between the gas-tight substrate and the gas-tight glass plate, can escape along routes that are not excessively long. If the gases cannot escape entirely since the rims of the superimposed glass plate have already bonded to the substrate, then cushion-like bulges can occur in the central region of the glass plate, thus precluding any bond from forming between the substrate and the glass plate.

Therefore, large substrate areas are advantageously covered with several individual segments of the glass. Also, the forces necessary for detachment and their introduction into the substrate are more favorable in case of smaller glass segments. Thus, for example, a substrate area of 300×300 mm should not be covered with a glass plate of 300×300 mm but rather advantageously with three glass strips of respectively 300×100 mm.

This array of problems does not arise if, as proposed according to this invention, the glass is applied to the substrate as a glass powder and/or as a preparation comprising a glass powder.

The advantage of this procedure resides in that possibly arising gaseous reaction products can escape during the heating-up phase through the layer of glass powder lying on top of the substrate and, after melting of the powder, a solid layer can be in contact with the substrate. Furthermore, also uneven substrates can be treated in this way.

The glass powder is produced preferably from the aforementioned types of glass by crushing and grinding to particle sizes of preferably about 0.1 to 5 mm, especially 0.5 to 2 mm and can be spread on the substrate in a uniform layer thickness in the dry state or with a liquid for dust prevention. However, care must be taken that the powder coating is carried out so uniformly and in such a layer thickness that the powder, after bonding with the substrate at an elevated temperature, constitutes a solid layer.

In a preferred embodiment, a preparation of a glass powder is thus applied. A preparation is understood to mean suspensions, also so-called slurries or pastes, produced on the basis of the respective glass powder or based on suitable blends of various types of glass powders.

Such preparations can be produced in a relatively simple way, in most cases based on water with the aid of slurry adjuvants, so-called liquefiers, i.e., conventional anionic, non-ionic and preferably cationic surfactants, and of so-called regulators, i.e., in most cases organic conventional thickeners, such as, for example, starches, tyloses, or the like, which can also act as binding promoters between the substrate and the superposed layer. (However, care should be taken when choosing the thickeners that these preparations remain gas-permeable and that all gaseous reaction products, especially the water, can escape from the preparation.) Examples of surfactants are disclosed in Römpps Chemie-Lexikon, pp. 3494–3498 (1977).

Choosing the optimum thickener or surfactant is a matter of routine experimentation. Likewise, the slurry composition depends on the ingredients like the sort of glass, the particle size and surface area of the glass-powder, the water (deionized or not), the temperature, the type of mixer, the additives and so on. Such compositions are not for sale.

Advantages of this process are, in particular:
—Dust-free, uniform, flat application of the layer of material in a defined thickness,
—satisfactory bonding to the substrate, even prior to the effect exerted by the temperature,
—possibility of producing homogeneous blends of various kinds of glass,
—coverage of even large substrate areas in a very uniform, sharply delineated, and quick fashion.

It has been found surprisingly that, with the use of slurry adjuvants and/or liquefiers containing $Na^+$ or $K^+$ as the charge carriers, the temperature at which the substrate bonds to the layer of glass powder preparation will, in part, even be additionally lowered to a considerable degree. This saves energy costs.

Application of a uniform layer of defined thickness of the glass material placed on the substrate is a prerequisite, according to the process of this invention, for the formation of a readily and flatly removable surface area of a specific, likewise uniform depth.

In this connection, layer thickness proportions of substrate to the material, bonded to the substrate at a certain temperature, are advantageously preferably about 4:1 to 8:1.

If the glass layer to be bonded to the glass ceramic substrate and to produce a removable surface area is chosen to be too thin, then the surface area will not be adequately formed and in such case remains, for the largest part, firmly bonded to the substrate. Apparently, in these glass layers, the "tensile strength" and the "force" necessary for detaching a surface area during contraction of the glass in the cooling phase are not sufficient for tearing off a surface layer with the formation of a conchoidal fracture even if such glass layers adhere well to the substrate.

Glass layers that are too thick are uneconomical since their bonding to the substrate requires a greater amount of thermal energy, and the volume of the thus-formed material which, in the final analysis, must be passed on to waste disposal will only be unnecessarily enlarged. The general thickness ranges of the glass layer is preferably about 0.2–5 mm; an especially preferred thickness range is 0.5–1.5 mm.

In a preferred embodiment of the process, substrates are utilized having a thermal expansion coefficient $\alpha$ of $0 \pm 1.5 \times 10^{-7} \times K^{-1}$, a value which is true for glass ceramic, and layer materials are used having an $\alpha$ about $30-90 \times 10^{-7} \times K^{-1}$, as conventional for glasses.

The process of this embodiment of the invention is based on the very low thermal expansion of glass ceramic as compared with glass. When fusing glass onto the glass ceramic as a substrate and then cooling this bond, the applied glass layer separates due to contraction together with a thin layer of glass ceramic, with all coatings applied to the glass ceramic.

According to the process, the temperatures at which the material is bonded to the substrate, i.e., at which the glass is fused on the glass ceramic, are preferably about 650°–800° C., especially 750°–775° C.

The temperatures are primarily dependent on the type of glass. Low-melting glasses fuse onto the glass ceramic at about 660° C., float glass at about 775° C. The aforementioned temperatures are maintained for preferably about 10–20 minutes, advantageously around 15 minutes.

Thereafter the bond is cooled, advantageously to a temperature lying between (a) the temperature T at which substrate and material are bonded together, less about 400° C. (T-400° C.) and (b) room temperature, i.e., for float glass, for example, between 375° C. and room temperature. It is possible to quench the glass in cold water. Quenching accelerates the procedure but requires additional production and substrate-cleaning steps.

In this process, readily removable surface areas are formed to a depth of preferably about 0.1–0.8 mm, especially 0.2–0.4 mm which separate, in part, as relatively small, continuous layer areas, but, in part, also as loose granules and create a bare new surface on the substrate. Therefore, with conventional substrate thicknesses of 4–6 mm, for example, 90% to above 95% of the substrate is recovered.

The invention also relates to such substrates, reduced by a removable surface area of a specific depth, as produced in accordance with the above-discussed process.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the several views, and wherein:

FIG. 1 shows the course of a process in accordance with the invention wherein a decorated glass ceramic cooking surface forms a removable surface area of a specific depth together with the decoration located thereon, by the application of glass, subsequent tempering, and cooling of the bond, thereby creating a new surface on the substrate.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding German application P 42 30 732.5, filed Sep. 14, 1992, are hereby incorporated by reference.

EXAMPLES

EXAMPLE 1

The figure illustrates a used, decorated glass ceramic cooking surface 1 having a thickness of 4 mm which is a faulty product or has been returned to the manufacturer after several years of usage by the customer. The plate is mechanically placed on a belt 2, for example, by means of vacuum lifting units, positioned, and subsequently coated over the entire surface and in uniform fashion, for example, with a flowable preparation of a glass powder 3, a so-called slurry, in a layer thickness of 0.7 mm. A typical composition of such a slurry contains, for example, per 100 kg:

80 kg of glass powder, particle size 55% smaller than 1 mm, the upper limit of the particle size being less than the thickness of the glass layer, especially not more than 1.5 mm,
20 liters of demineralized water,
+0.01 kg of surfactant,
+0.1 kg of thickener, "Verdickungsmittel" [see Römpps Chemie-Lexikon, pp. 3792 (1977)].

Typically, lead-containing scrap glass is utilized as the starting glass for the glass powder, as employed for general electrotechnical applications, e.g., also for flaring portions of television picture tubes. Such glasses contain about 20–30% by weight of PbO.

The slurry is processed in the wet state in a barrel mill or a so-called attrition mill until the desired grain size has been obtained.

However, the slurry can also be adjusted to be thixotropic, for example, with bentonite and/or kaolin with the consequence that the slurry, as soon as it is discharged from the storage tank 4 kept in agitation by agitator units, will solidify on the plate in a short period of time.

The plate, thus coated with glass powder slurry, is then further conveyed on the roller belt 2 into the preheating zone 5 of the furnace 6 and dried before it is then tempered at 775° C. During this step, the glass is fused onto the glass ceramic. After about 15 minutes, the glass ceramic substrate plate with the superficially fused-on glass material is further transported out of the furnace 6 into a cooling zone 7 wherein the solidified glass, due to its thermal expansion coefficient that differs from the substrate, will then begin, at temperatures starting with about 380° C., to tear off together with a thin surface region of the substrate.

Behind this zone, the granulated substance, fractured in conchoidal fashion, now lying loosely upon the surface and made up of glass material, substrate surface, and all decorations applied to the substrate surface, is removed (8).

This is possible in an especially simple and dust-free way by vacuuming the surface with a linear suction nozzle 9 extending over the entire width of the plate.

The plate 10 present at the end of the belt is now cleaned of all coatings and can be reused without any problems as a raw material.

Of course, instead of a preparation of a glass powder, it is also possible to apply the glass powder in the dry state to the substrate.

EXAMPLE 2

The glass is applied to the substrate in the form of a plate.

A glass plate with the dimensions of 500×500 mm is then layered with several strips of float glass of a size of 500×100 mm and a thickness of 1 mm. The process is conducted otherwise entirely in correspondence with Example 1.

The granulated substance, separated by conchoidal fracture, of glass ceramic, substrate surface, and all decorations applied to the substrate surface, can be repeatedly reground and processed according to the invention and can be reused either as a glass powder in the dry state or in a preparation, in a proportional or exclusive manner.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the formation of a removable surface area from a glass ceramic substrate, said removable surface containing all coatings on the surface of the glass ceramic substrate and being thinner than said substrate, said coatings having a different chemical composition than said glass ceramic substrate, said process comprising bonding to the coated glass ceramic substrate a layer of a glass material having a thickness less than the thickness of the glass ceramic substrate and the glass material having a thermal expansion coefficient at least ten-fold that of the glass ceramic substrate, and subsequently cooling the bonded composite to a sufficiently lower temperature to separate from the glass ceramic substrate the bonded layer fused to the removable surface area.

2. A process according to claim 1, wherein the glass material is a float glass, a low-melting glass, or a scrap glass.

3. A process according to claim 1, wherein the glass material is placed in the form of a plate on the substrate.

4. A process according to claim 1, wherein the glass material is applied in the form of glass powder composition to the substrate.

5. A process according to claim 1, wherein the glass ceramic thickness of the substrate to the thickness of the bonded glass material is 4:1 to 8:1.

6. A process according to claim 1, wherein the glass ceramic substrate has a thermal expansion coefficient $\alpha$ of $0 \pm 1.5 \times 10^{-7} \times K^{-1}$ and the glass material has a thermal expansion coefficient $\alpha$ of $30-90 \times 10^{-7} \times K^{-1}$.

7. A process according to claim 1, wherein the glass material is bonded to the substrate at 650°–800° C.

8. A process according to claim 7, wherein the glass material is bonded to the substrate at 750°–775° C.

9. A process according to claim 1, wherein the glass material bonded to the glass ceramic substrate is cooled to a temperature between (a) the temperature at which the glass ceramic substrate and the glass material are bonded, minus 400° C., and (b) room temperature.

10. A process according to claim 1, wherein the removable surface area is formed down to a depth of 0.1–0.8 mm.

11. A process according to claim 1, wherein the removable surface area is formed down to a depth of 0.2–0.4 mm.

12. A process according to claim 1, wherein the glass ceramic substrate is in the form of a plate.

13. A process according to claim 12, further comprising recovering resultant glass ceramic substrate plate and recycling said resultant plate to a production process for making new glass ceramic articles.

14. A process according to claim 1, wherein the glass ceramic plate has an area of from 300 mm by 300 mm to 500 mm by 500 mm.

15. A process according to claim 11, wherein the glass ceramic substrate has a thickness of 4–6 mm.

16. A process according to claim 1, wherein the glass material has a thickness range of 0.2–5 mm.

17. A process according to claim 11, wherein the glass material has a thickness range of 0.5–1.5 mm.

18. A process according to claim 12, wherein the glass ceramic plate is in the form of a decorated cooking surface or a heatable plate for grilling food or a fireplace pane.

19. A process according to claim 1, wherein said coatings comprise lead-containing decorations.

* * * * *